United States Patent

[11] 3,612,574

[72] Inventors Emil Klopfer
Engen;
Martin Stelzle, Gottmadingen; Edwin Schneble, Gailingen, all of Germany
[21] Appl. No. 821,707
[22] Filed May 5, 1969
[45] Patented Oct. 12, 1971
[73] Assignee Maschienenfabrik Fahr AG
Gottmadingen, Germany

[54] HITCH AND POWER-TAKEOFF ASSEMBLY FOR CONNECTING FARM IMPLEMENTS TO A VEHICLE
10 Claims, 8 Drawing Figs.
[52] U.S. Cl. .................................................. 280/467,
172/272, 172/276, 180/14 R, 280/461 A
[51] Int. Cl. ..................................................... B60d 1/00
[50] Field of Search .......................................... 280/456,
467, 477, 475, 479, 46 A, 446 (.1); 172/272, 273
276

[56] References Cited
UNITED STATES PATENTS
3,117,685 1/1964 Davis............................ 280/456 UX
3,155,250 11/1964 French et al................... 280/456 UX
3,388,928 6/1968 Poker et al..................... 280/481 X
FOREIGN PATENTS
972,208 10/1964 Great Britain................ 280/456

*Primary Examiner*—Benjamin Hersh
*Assistant Examiner*—Milton L. Smith
*Attorney*—Karl F. Ross ABSTRACT: A self-propelled farm vehicle, e.g. a crop-pickup loader or wagon, is fitted with a horizontal profiled bumper of noncircular cross section along which an implement hitch or support can ride. This support is provided with a hydraulic cylinder which operates a parallelogrammatic linkage connected to a generally upright member which can be lifted or lowered relative to the bumper or crossbar. A generally cylindrical coupling bolt having a narrow end is mounted on this vertical member and is adapted to engage in a confronting hole on a farm implement. A locking pawl catching in a groove on the bolt holds the implement in place while allowing it to swing from side to side to a limited extent. A power-takeoff shaft is journaled in a plate pivoted about a horizontal axis on the bumper and is coupled with a pivotal chain transmission on the implement.

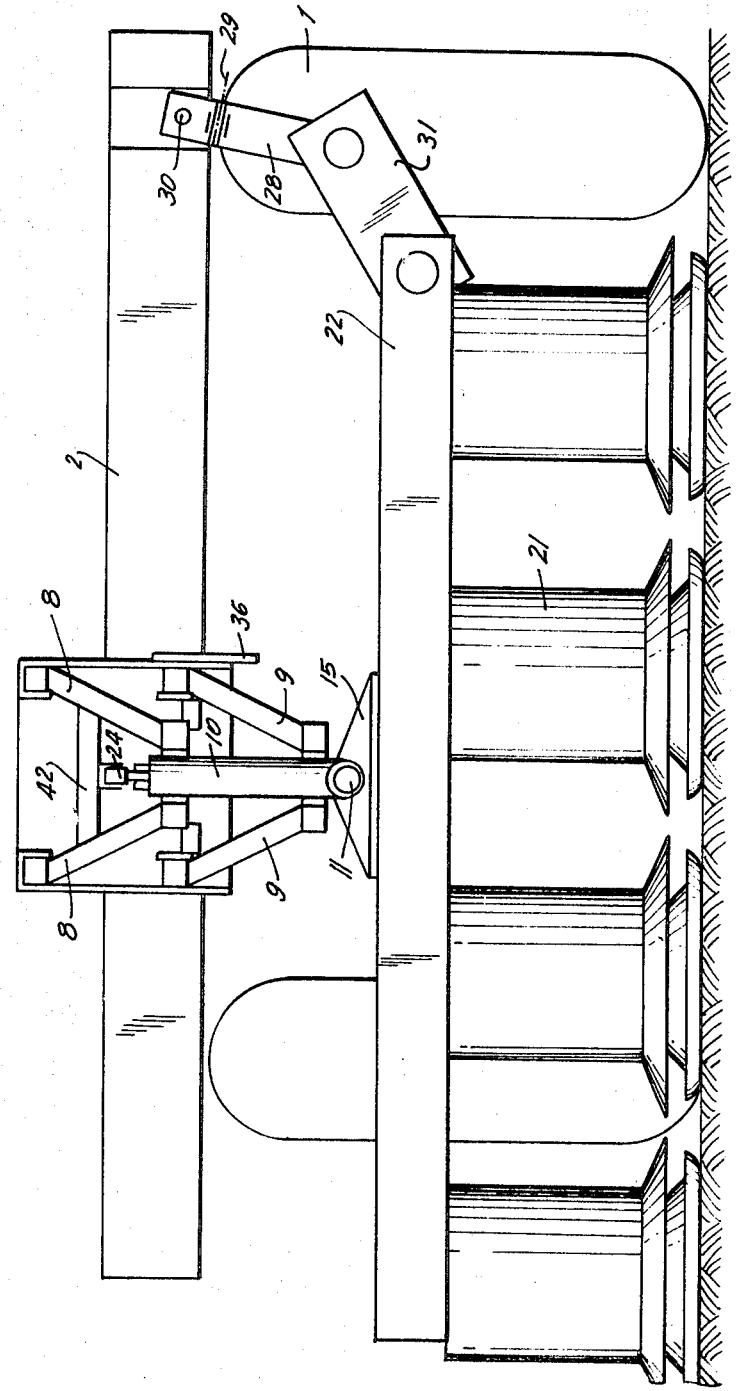

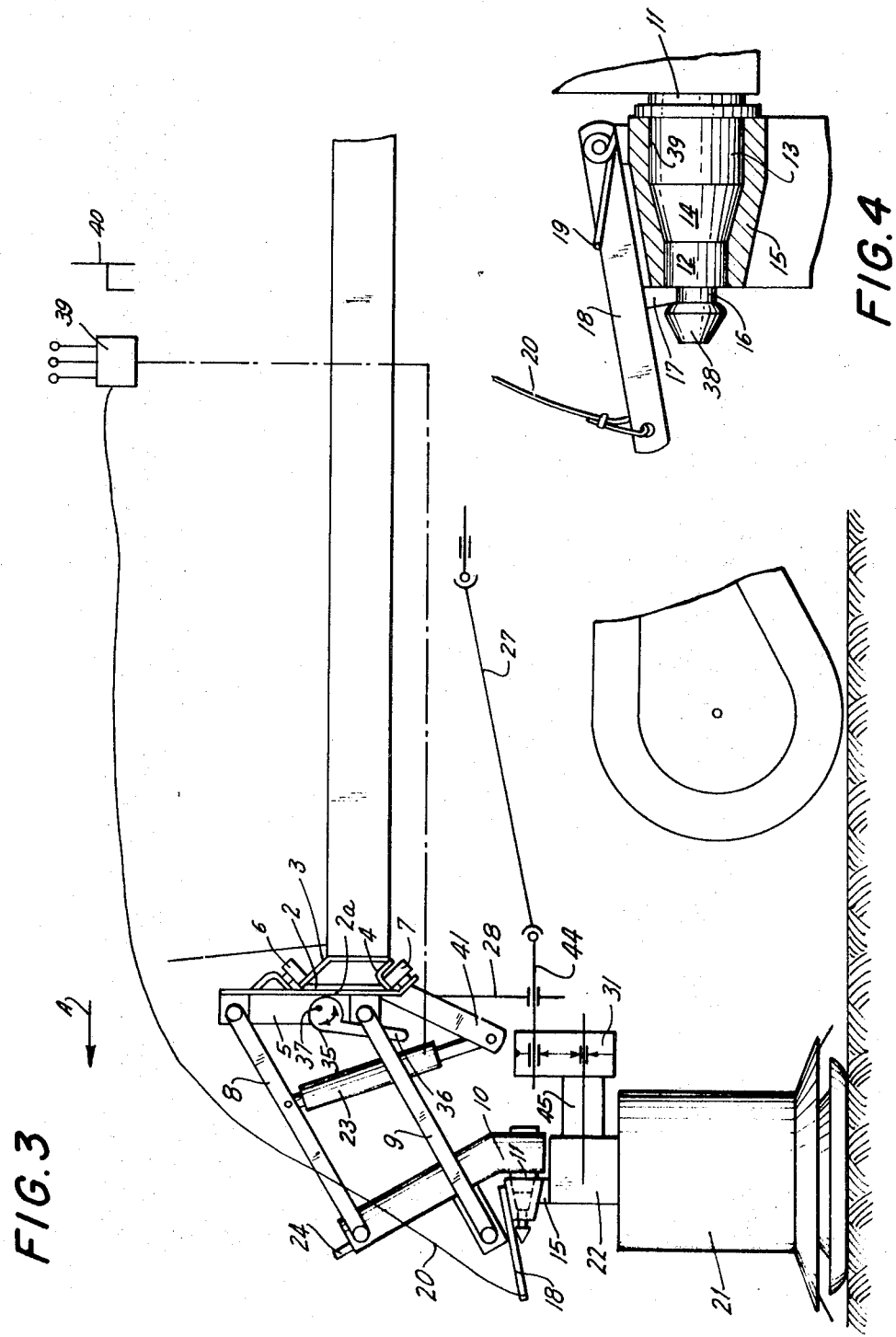

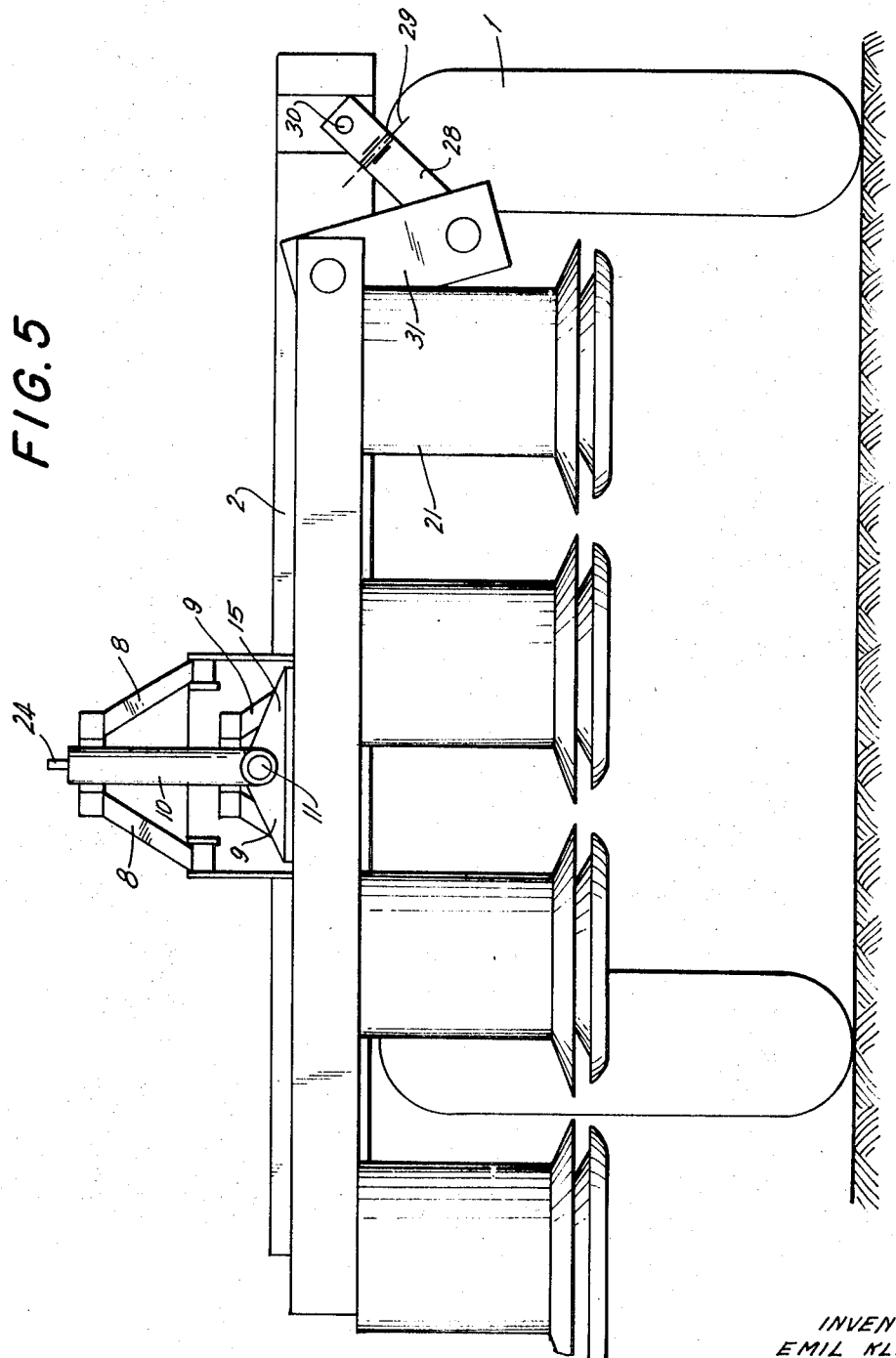

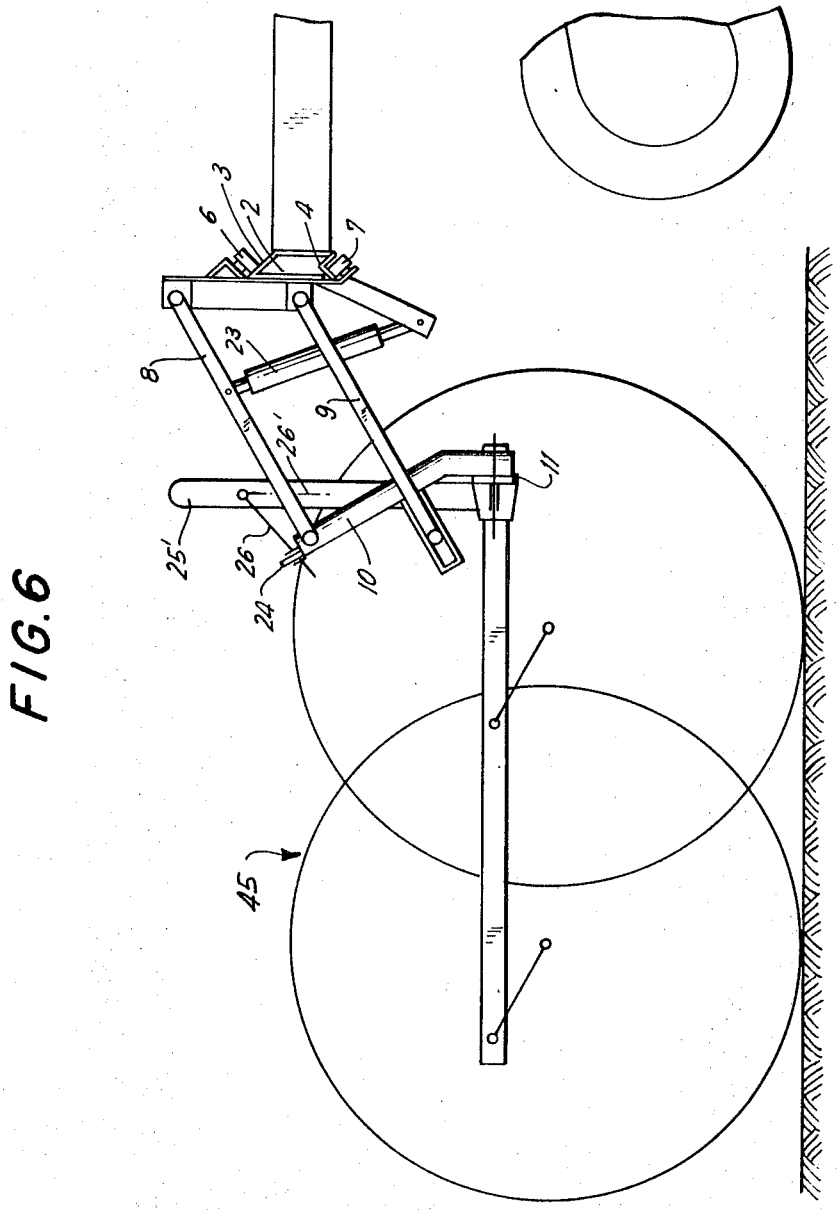

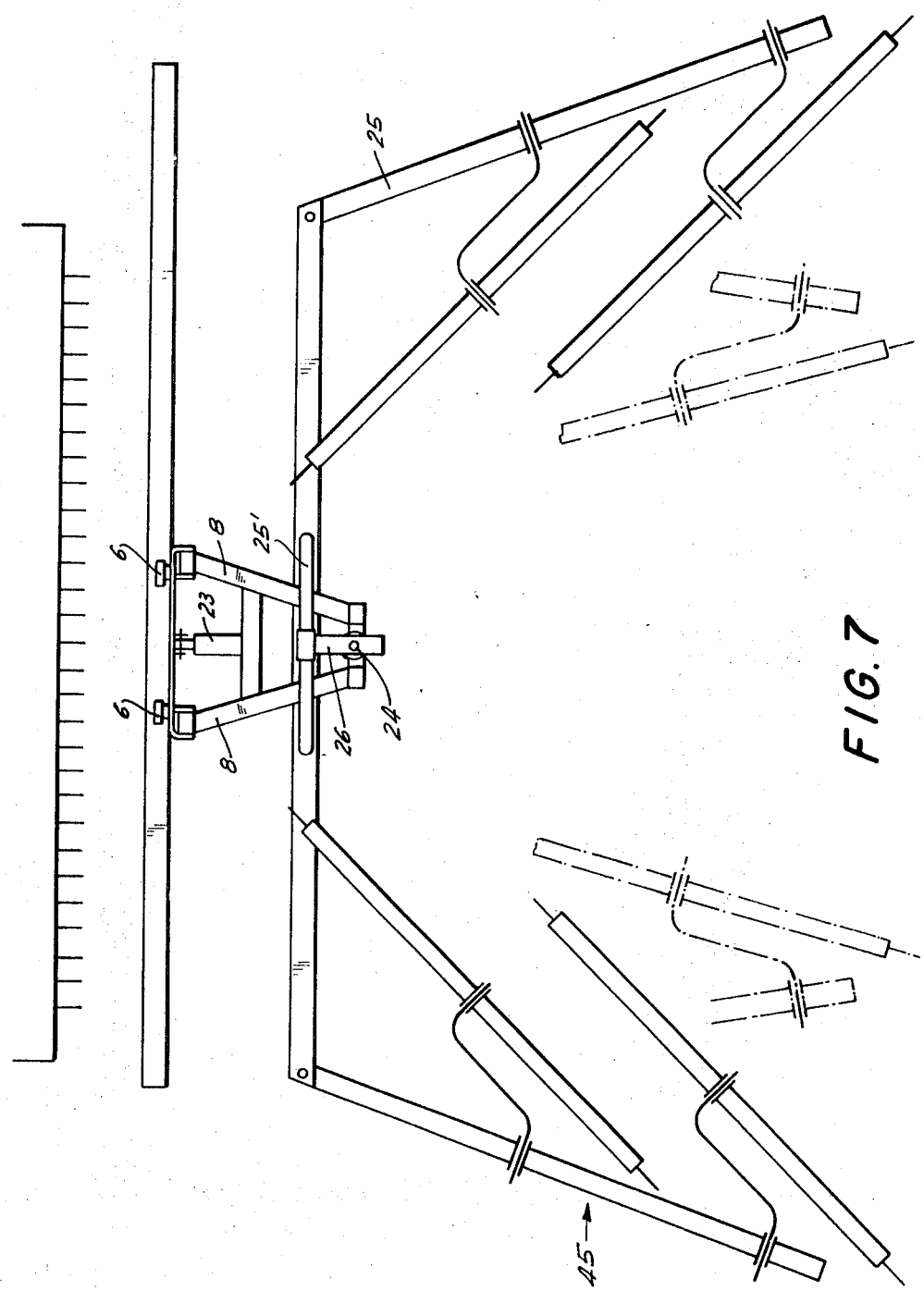

HITCH AND POWER-TAKEOFF ASSEMBLY FOR CONNECTING FARM IMPLEMENTS TO A VEHICLE

Our present invention relates to a hitch and power-takeoff assembly for attaching an implement to a vehicle and, more particularly, for coupling a soil or crop preparation, tedding, planting or harvesting farm implement to a self-propelled farm vehicle, especially a self-propelled pickup wagon or truck having a crop-pickup unit at its end to lift previously cut (and swathed) crop material from the ground into the truck.

Both front and rear hitch assemblies are known for farm vehicles, usually farm tractors, and implements connectable thereto. Such assemblies generally have a simple member which can be displaced upwardly and downwardly and to which an implement can be coupled. Such a hitch does not readily permit adjustment of the position of the implement laterally of the direction of travel of the vehicle. This implement must, therefore, be used in one position, whether that is convenient or not. Furthermore, such assemblies provide very little adaptability for different tools.

The difficulty is especially acute when the vehicle is a self-propelled agricultural truck or pickup wagon. Such units are provided at their front ends with so-called "pickup" mechanisms designed to lift a crop material, preferably from a swath or windrow onto the vehicle for storage, further processing, packaging or simply transportation. It is particularly convenient, with such machines, to provide implements or attachments ahead of the pickup unit, such attachments including, for instance, rotary or outriggers mower assemblies (sicklebar arrangements) adapted to cut the crop material, crop-turning and crop-tedding rakes for previously cut crop material, windrowing rakes for gathering the crop material and positioning it in alignment with the pickup unit, etc. Since the pickup attachment may have a wide or narrow throat and/or the attachment to be affixed to the self-propelled machine may be appropriately positioned at the center or to a side, depending upon the nature of the attachment or the task to be performed, ease of positioning the attachment transversely of the direction of vehicle travel is essential.

It is, therefore, the general object of our present invention to provide an improved hitch assembly.

More specifically, it is an object of our invention to provide a hitch assembly which is extremely adaptable and which can be used in many positions with many different implements.

A further object is to provide a power-takeoff assembly which is extremely adaptable and which can be used with our improved hitch assembly.

A more specific object of our present invention is to provide, for the combination of a self-propelled agricultural field-traveling machine and an implement to be removably affixed thereto for field work, an improved system for connecting the implement to the vehicle whereby the implement can be conveniently and accurately positioned transversely of the direction of vehicle travel and, in spite of its selective positioning, can be raised or lowered in a convenient manner.

Yet another object of this invention is to provide an improved self-propelled agricultural vehicle with readily adjustable hitch means enabling a wide variety of implements to be removably attached thereto in a variety of positions and with relative ease of control.

The above objects are attained, in accordance with the principal features of the invention, with a hitch assembly consisting of a profiled bumper mounted (or traverse bar of noncircular cross section) on the front and/or rear of a vehicle and having a uniform cross section transversely of the direction of travel. A support is provided to ride along, and be locked at any position on this bumper or rail, but cannot twist or rotate around it. A substantially parallelogrammatic linkage consisting of at least one lower and one upper link is connected at one end to the support and at the other end to a coupling member or bar. A hydraulic cylinder is braced against this support and serves to lift the outside end of the links.

According to a further feature of our present invention, a coupling bolt consisting of two cylindrical portions of different diameters, preferably in a 1:2 relationship, separated by a frustoconical neck portion, is engageable in a similarly dimensioned, generally complementary, hole in the implement. A groove around the narrower leading end of the bolt is engageable by a nose of a locking pawl to hold the implement in place while allowing it to rock from side to side pendulously to a limited extent about an axis defined by the pin.

The power-takeoff assembly of the present invention consists of a drive shaft. which may be connected via a clutch to a motor; the drive shaft, in turn, is connected by a universal joint with a power-takeoff shaft which is journaled in a support suspended from the bumper. The implement is provided with a chain transmission coupled to this shaft to allow a great freedom of movement to the implement (e.g. at least two degrees of freedom whereby the implement may be shifted longitudinally along the rail and raised and lowered relatively thereto). The plate, or support member is pivotal about two horizontal mutually transverse axes to aid this motion.

Thus, the assemblies according to the present invention allow a farm implement to be quickly and easily coupled to the hitch. Then its lateral setting relative to the vehicle is simply a matter of sliding it along and locking it in the desired plane. Furthermore, this hitch assembly serves equally well for a multitude of different implements.

The above and other objects, features and advantages will become more readily apparent from the following description, reference being made to the accompanying drawing in which:

FIG. 2 is a front view of the apparatus shown in FIG. 1;

FIG. 3 is a side view of the same apparatus;

FIG. 4 is a sectional view of a detail of FIG. 3, in enlarged scale;

FIG. 5 is the apparatus shown as in FIG. 2, with the mower in its raised, transport position;

FIG. 6 is a side view of a hay rake mounted by another embodiment of one of our hitches on the front of a crop loader;

FIG. 7 is a top view of the apparatus of FIG. 6; and

Figure 1:
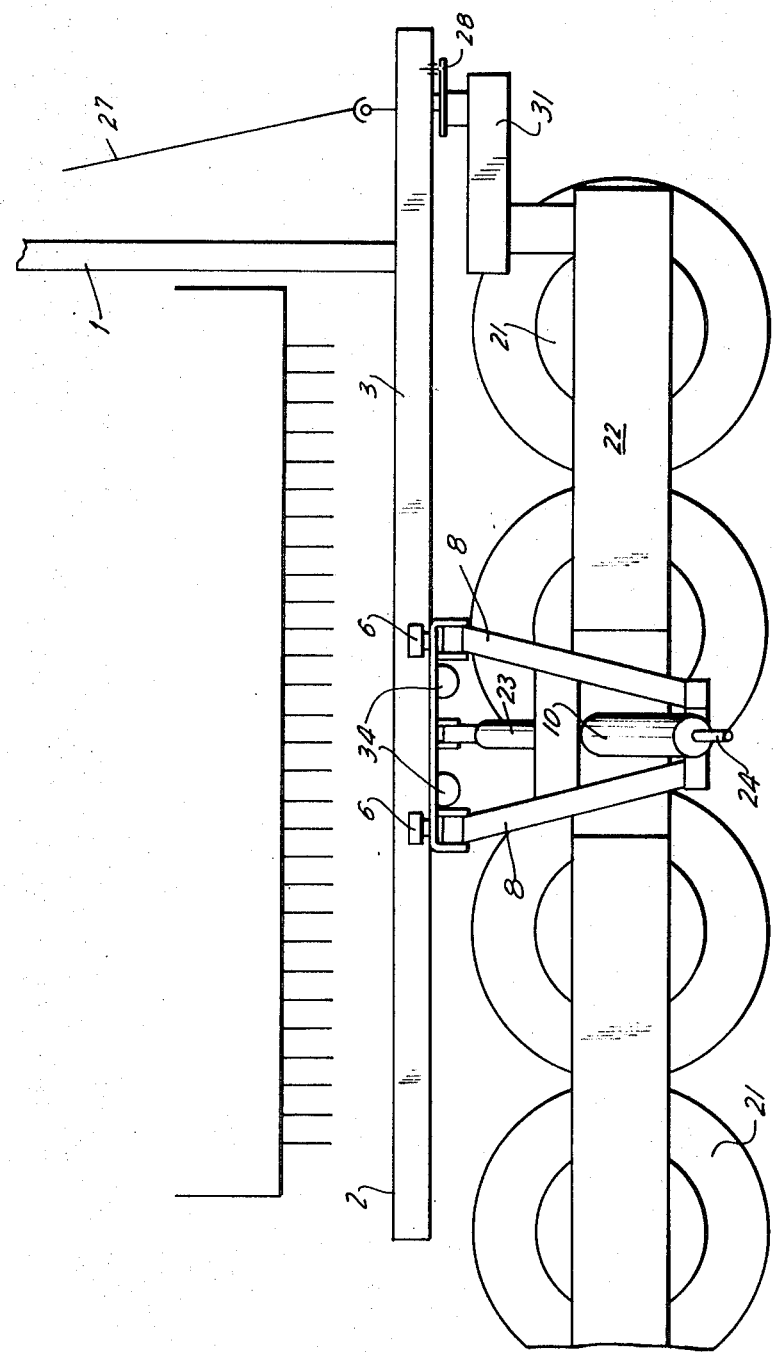
FIG. 1 is a top view of the hitch used to mount a plurality of rotary mowers on the front of a crop loader.

As shown in FIG. 1, a farm vehicle 1, here a front crop loader, has a front bumper 2 in the form of a horizontal beam or rail with a generally trapezoidal cross section. The rail or beam runs transversely of the direction of travel of the vehicle.

As is shown in better detail in FIG. 3, this beam 2 has a front face 2a, a top side 3, and a bottom side 4 both converging away from this face 2a. A support 5 lies with rollers 34 against this face 2a with respective rollers 6 and 7 against the flanks 3 and 4 of the beam 2. These rollers 34, 6, and 7 stand perpendicular to the surfaces on which they are intended to roll. Thus, the support 5 can be displaced along the beam 2 with little effort, but, since it effectively embraces this beam 2, is constrained from twisting thereabout.

An eccentric disk 35 with a handle 36 is pivoted about a pin 37 which extends transversely to the vehicle direction of travel as represented by an arrow A. This wheel 35 can cammingly engage the face 2a of the beam 2 to lock it in place when desired.

FIG. 2 also shows how two upper links 8 and two lower links 9 are pivoted on the support 5 and on a coupling member as bar 10. The links 8 and 9 here are of equal length to form a parallelogrammatic linkage.

As shown in detail in FIGS. 3 and 4 a horizontal, forwardly extending coupling bolt 11 is fixed on the lower end of the coupling member 10. This bolt 11 has a pointed, conical end 38, an annular groove 16, a relatively narrow leading end portion 12, a frustoconical neck 14, and a relatively thick waist portion 13, the portion 13 being twice as thick as the portion 12. A bore 39 of corresponding dimensions and configuration is formed as a coupling body 15 on elongated support 22 on which are mounted four rotary mowers 21. A locking pawl 18 pivotal on the body 15 is formed with a nose 17 urged into the groove 16 by a spring 19. A cable 20 leads to a control panel 39 located adjacent the operator's seat 40.

A downwardly extending, depending arm 41 is mounted on the support 5 and serves as one end mounting point for a hydraulic cylinder 23 whose other end is pivoted near the center of the upper links by means of a cross bar 42. This cylinder 23 is also controlled from the driver's seat 40.

An output drive shaft 27 leading from a prime mover has a universal joint 43 connected to a power-takeoff shaft 44 journaled in a support member or hanging plate 28 which is pivoted on the bumper 2 at 30 and fitted with a hinge allowing it to bend at 29. Thus, this plate 28 has two degrees of freedom—one transverse to and one parallel to the direction of travel of the vehicle 1. The end of the shaft 44 is connected to a chain transmission 31 which in turn can pivot about an axis 45 parallel to the direction of arrow A.

Thus, to mount an implement on the hitch assembly, the front coupling member is dropped and the pin 11 lined up with the bore 39 in the implement frame. Then the vehicle 1 is moved forwards and the nose 17 automatically engages in the groove 16 to lock it in place. The preferably splined shaft 44 is also fitted through the transmission 31 and clamped by means not shown. Then the piston 23 can be actuated such that the support frame member 22 of the implement is lifted until it contacts the two links 9. This holds it in a firm horizontal position in front of the vehicle 1, as illustrated in FIG. 5 with no rocking possible due to three-point contact. The setting of the support 5 along the beam 2 is carried out by hand, and the cam 35 rotated to hold it in place.

When the location intended to be worked is arrived at, the piston 23 is drained to lower the mowers 21. Once the beam 22 leaves contact with the two links 9, it is free to rock to a limited degree about the bolt 11 to conform to the terrain. This rocking will not effect the functioning of the power-takeoff assembly at all.

To finally free the mowers 21 from the vehicle 1, they need merely be lowered onto the ground, the cable 20 pulled to draw the nose 17 out of the groove 16, and the vehicle backed away from them.

Figure 8:
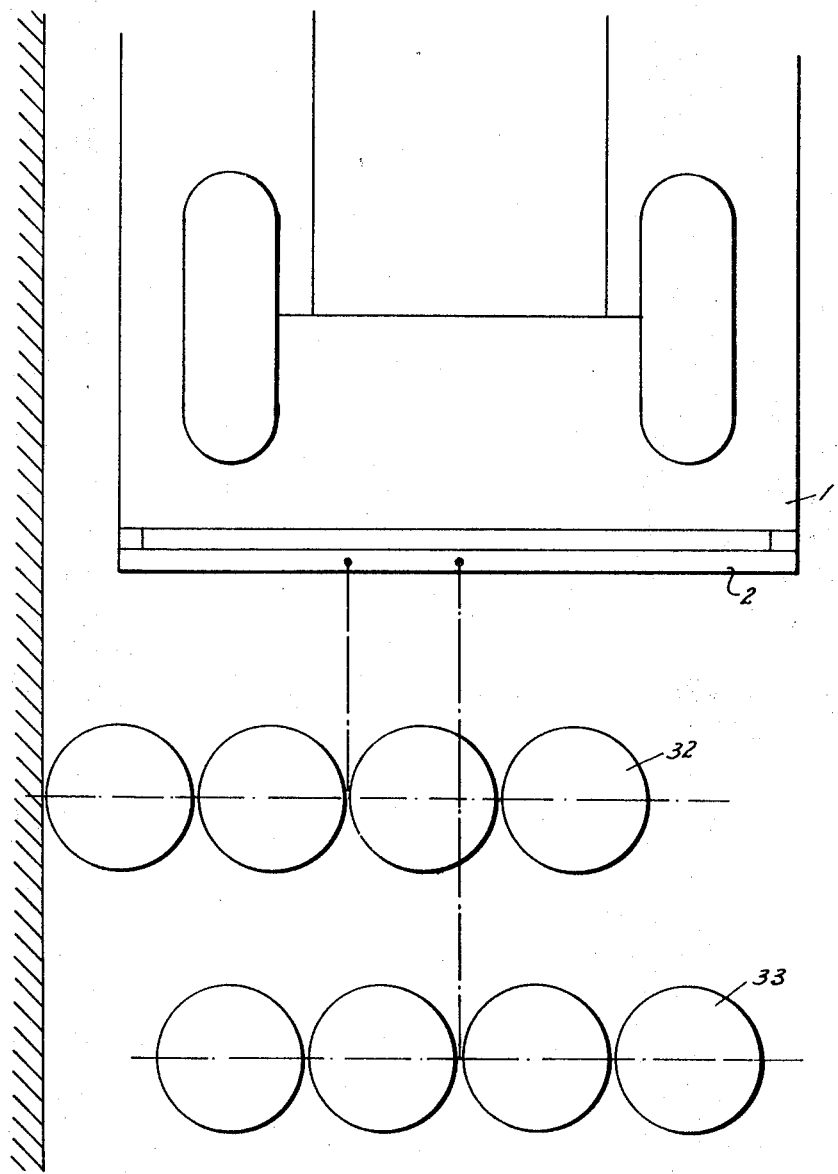
FIG. 8 is a schematic top view showing two positions a rotary mower can assume using the invention.

As shown diagrammatically in FIG. 8, in order to reduce the dimensions of the vehicle 1, the mowers, which are used in the position shown by 32, can be slid to the center as shown by 33.

FIGS. 6 and 7 show a similar system wherein like numbers refer to like parts. Here, however, a hay rake 45 is mounted on the hitch assembly which is different only in that its lower links 9 are longer than the upper links 8. The rake 45 has a frame 25 with a vertical U-shaped member 25' surrounding the hitch assembly. This member 25' has a bar 26 pivotal on it and engageable around a pin 24 on the top of the bar 10. During normal operation the rake 45 is down and the bar 26 hangs in the dot-dash line position 26'. However, during transport this bar 26 is swung around and dropped over the pin 24. This action prevents the forward end of the rake 45 from dropping when it is lifted. In addition, since the links 9 are longer than the links 8, the front end of the rake 45 is lifted higher (and faster) than the rear end. Such a transport position is especially useful with especially long implements, such as corn choppers.

It is to be noted that, as the ratio of the diameters of the two cylindrical lengths 12 and 13 increases, above the aforedescribed minimum of 1:2, the simpler becomes the attachment of the implement.

Although the hitch and power-takeoff assemblies are described as used on a crop front loader, they are not by any means limited to such vehicles. Indeed, a great advantage of them is that if, for instance, a normal farm vehicle such as a truck is fitted with a bumper as shown, during harvesting and planting it can also serve as a tractor for many tasks usually reserved for tractors alone.

Furthermore, snow plows, spraying devices, and many different pieces of equipment can be quickly and easily mounted with my hitch assembly. The bumper need not only be mounted on the front, as shown here, but can be on the back also. It is thereby possible to mount one implement, for example a fertilizing dispenser, on the front of a vehicle while a plow or harrow can be mounted on the back and two operations can be carried out at one pass, perhaps by a standard heavy-duty farm truck normally used for deliveries or other nonagricultural purposes.

In addition, two different supports 5 or more can possibly be mounted on one bumper for special tasks, or in case of emergencies. Yet when they are not needed, these hitches can easily be slipped off the bumper and set aside.

We claim:

1. A hitch assembly for attaching an implement to an end of a vehicle, said assembly comprising:

a substantially horizontal beam fixed to said end and extending transverse to the direction of travel of said vehicle, said beam having a noncircular substantially uniform cross section;

a support shiftably mounted nontwistably on said beam;

roller means on said support engaging said beam for permitting displacement of said support along said beam;

releasable means for locking said support on said beam at substantially any position therealong;

link means extending between said support and said implement and including two vertically spaced pairs of link members pivotally connected directly to said support at horizontally spaced locations for pivoted movement about horizontal axes; and lift means between said support and said link means for raising said link means and said implement.

2. A hitch assembly for attaching an implement to an end of a vehicle, said assembly comprising:

a substantially horizontal beam fixed to said end and extending transverse to the direction of travel of said vehicle, said beam having a noncircular substantially uniform cross section;

a support shiftably mounted nontwistably on said beam;

roller means on said support engaging said beam for permitting displacement of said support along said beam;

releasable means for locking said support on said beam at substantially any position therealong;

link means extending between said support and said implement; and lift means between said support and said link means for raising said link means and said implement, Said link means extending transversely to said beam and including a coupling member connected to sad implement and at least to substantially parallel elongated link elements lying one above another, each of said elements being pivoted at one end on said support and at the other end on said coupling member.

3. The assembly defined in claim 2, wherein said beam has a generally vertical front face and an upper and a lower flat side converging toward each other away from said face and forming acute angles with said face, said support embracing said beam with said roller means engaging said sides.

4. The assembly defined in claim 3, wherein said roller means includes at least two rollers lying generally in planes perpendicular to said sides.

5. The assembly defined in claim 2, wherein said releasable means includes an eccentric disk rotatable about an axis substantially transverse to said direction of travel and cammingly engageable with said beam.

6. The assembly defined in claim 2, wherein said link means further comprises a substantially horizontal cylindrical coupling bolt fixed on said member and extending substantially parallel to said direction of travel, said bolt having a cylindrical leading end portion and a cylindrical trailing end portion, said leading portion being of a lesser diameter than said trailing portion.

7. The assembly defined in claim 6 wherein the diameter of said leading portion is less than half that of said trailing portion.

8. The assembly defined in claim 7 wherein said bolt is formed with a frustoconical neck between said portions, said leading portion being further formed with a depression, said implement having a coupling body formed with a throughgoing bore conforming roughly to said bolt, said bolt being engageable through said bore, and said link means being further provided with a locking pawl engageable in said depression whereby, with said bolt engaged through said pawl, said pawl holds said body on said bolt.

9. The assembly defined in claim 8 wherein said locking pawl is pivotally mounted on said coupling body.

10. The assembly defined in claim 2 wherein said lift means is an expandable cylinder pivoted at one end on said support and at the other end on said link means.